(12) United States Patent
Tagawa et al.

(10) Patent No.: US 7,583,854 B2
(45) Date of Patent: Sep. 1, 2009

(54) DATA PROCESSING SYSTEM AND METHOD FOR 2-DIMENSIONAL DATA WITH SETTING A BLOCK SHAPE

(75) Inventors: Hiroki Tagawa, Fuchu (JP); Atsushi Masuda, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 942 days.

(21) Appl. No.: 11/090,124

(22) Filed: Mar. 28, 2005

(65) Prior Publication Data

US 2006/0110066 A1 May 25, 2006

(30) Foreign Application Priority Data

Nov. 22, 2004 (JP) ............... 2004-337464

(51) Int. Cl.
*G06K 9/36* (2006.01)
(52) U.S. Cl. .................................... 382/276
(58) Field of Classification Search ................ 382/276
See application file for complete search history.

(56) References Cited

U.S. PATENT DOCUMENTS 6,108,450 A * 8/2000 Ueda ......................... 382/237
7,336,398 B2 * 2/2008 Chang et al. ................ 358/3.03
2002/0003632 A1 * 1/2002 Nakano et al. .............. 358/1.9
2005/0007357 A1 * 1/2005 Yamashita et al. .......... 345/204
2005/0007375 A1 * 1/2005 Yi .............................. 345/537

FOREIGN PATENT DOCUMENTS

| JP | H07-020839 | 1/1995 |
| JP | 10-136382 | 5/1998 |
| JP | H10-224627 | 8/1998 |
| JP | 11-259646 | 9/1999 |

* cited by examiner

*Primary Examiner*—Wenpeng Chen
(74) *Attorney, Agent, or Firm*—Oblon, Spivak, McClelland, Maier & Neustadt, P.C.

(57) ABSTRACT

A data processing system includes a block setting module setting a to-be-processed block shape including subject data, which is one of 2-dimentional data in a matrix stored in a virtual storage area, and influenced data influenced by results of processing subject data, a division module dividing 2-dimentional data into a plurality of execution blocks based on information of the to-be processed block shape, and a processing module sequentially processing data in each execution block along a row direction in units of execution blocks.

14 Claims, 10 Drawing Sheets

DATA PROCESSING SYSTEM AND METHOD FOR 2-DIMENSIONAL DATA WITH SETTING A BLOCK SHAPE

CROSS REFERENCE TO RELATED APPLICATIONS AND INCORPORATION BY REFERENCE

This application is based upon and claims the benefit of priority from prior Japanese Patent Application P2004-337464 filed on Nov. 22, 2004; the entire contents of which are incorporated by reference herein.

BACKGROUND OF THE INVENTION

1. Field of the Invention

The present invention relates to a data processing system and a data processing method, particularly for two-dimensional data or image data.

2. Description of the Related Art

When processing 2-dimentional data such as image data in a matrix stored in a virtual storage area, a single row of data is processed piece by piece, in general. After the entire single row of data has been processed, the next single row of data is processed piece by piece in the same manner.

When processing data by hardware that is dedicated to image data processing, the processing is carried out after all the data is stored in an internal memory of the hardware. Accordingly, an image data processing method of dividing image data into a matrix to generate a plurality of blocks is widely used. Each block is executed by data processing, which is carried out block by block independently. In the case where dividing into blocks does not occur, the capacity of the internal memory needs to correspond to the width of an image frame to be executed by data processing. However, in the case where dividing into a plurality of blocks occurs and then data processing in each of the plurality of blocks occurs, the capacity of the internal memory is reduced to a capacity corresponding to the number of data included in each block.

However, when processing data in each block using an algorithm, which is designed without considering such block division processing, the following problems may occur. When processing subject data (hereafter, referred to as 'subject data'), the results of processing subject data may be considered in another data processing. In this case, an algorithm is designed so that data to be influenced by the results of processing subject data is processed after processing that subject data. However, when processing data in each block, data to be influenced by the results of processing subject data (hereafter, referred to as 'influenced data') may be included in a block to be executed by data processing before processing a block including the subject data. In this case, it is difficult to process such influenced data taking the results of processing the subject data into account. With that algorithm, the subsequent block is processed taking into account the influences from a previously processed block. However, it is difficult to reflect in the previously processed blocks the results of processing the subsequent block. Therefore, it is difficult to provide the same results of processing data without dividing into blocks compared to results of processing data with dividing into blocks.

Meanwhile, minute calculation for correction so as to accurately predict an influence on influenced data included in a previously processed block requires an increased amount of calculations. Accordingly, processing speed decreases and/or errors resulting from processing increase.

SUMMARY OF THE INVENTION

An aspect of the present invention inheres in a data processing system including a block setting module configured to set a to-be-processed block shape including subject data, which is one of 2-dimentional data in a matrix stored in a virtual storage area, and influenced data influenced by results of processing the subject data; a division module configured to divide the 2-dimentional data into a plurality of execution blocks based on information of the to-be processed block shape; and a processing module configured to sequentially process data in each execution block along a row direction in units of execution blocks.

Another aspect of the present invention inheres in a computer implemented method for processing two-dimensional data, including setting a to-be-processed block shape including subject data, which is one of 2-dimentional data in a matrix stored in a virtual storage area, and influenced data influenced by results of processing the subject data; dividing the 2-dimentional data into a plurality of execution blocks based on information of the to-be-processed block shape; and sequentially processing data included in each execution block along a row direction in units of execution blocks.

Still another aspect of the present invention inheres in a computer implemented method for processing image data, including setting a to-be-processed block shape including subject data, which is one of image data in a matrix stored in a virtual storage area, and influenced data influenced by results of processing the subject data; dividing the image data into a plurality of execution blocks based on information of the to-be processed block shape; and sequentially processing data included in each execution block along a row direction in units of execution blocks.

DETAILED DESCRIPTION OF THE INVENTION

Figure 1:
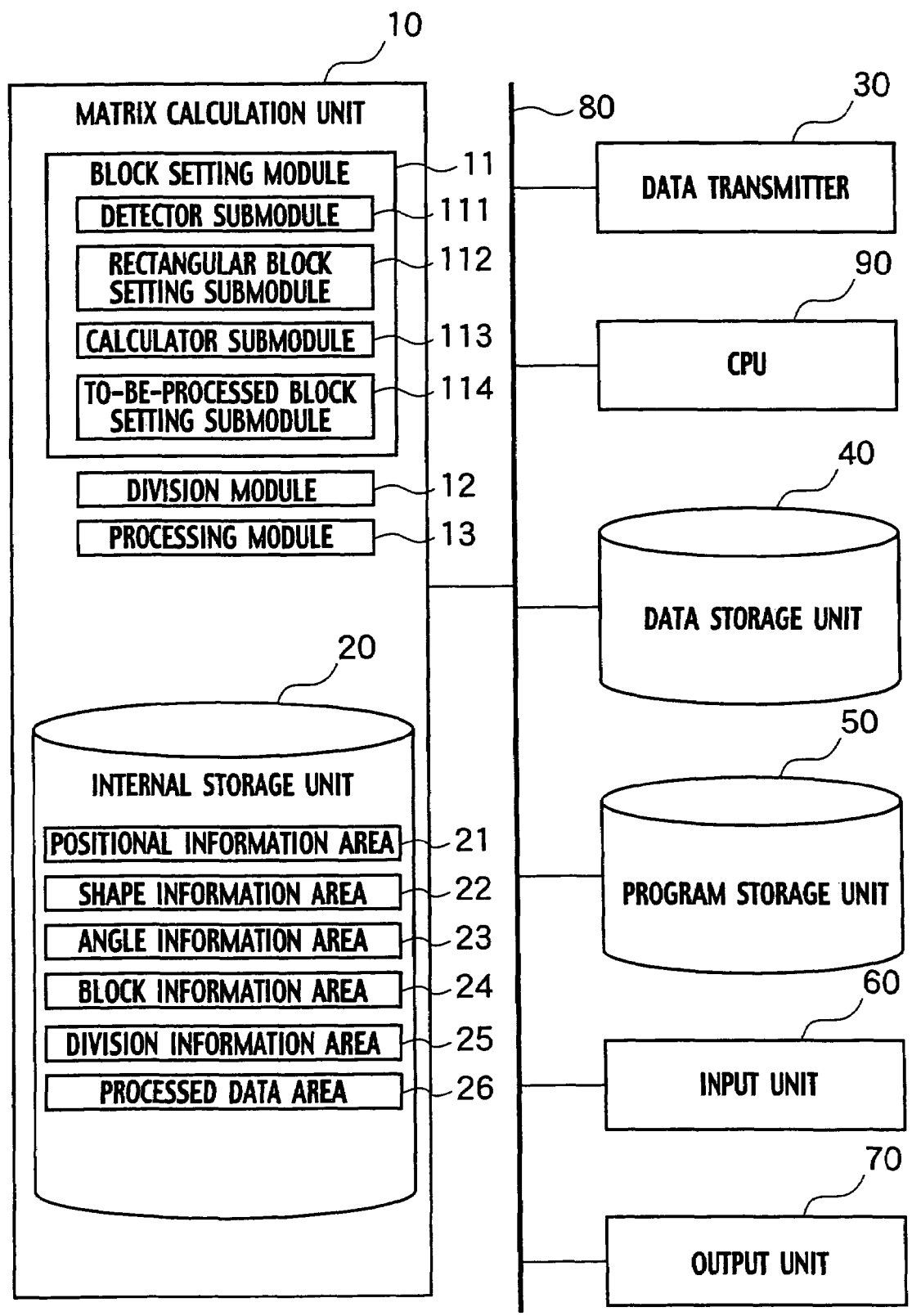
FIG. 1 is a schematic diagram showing a structure of a data processing system according to a first embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

In the following descriptions, numerous specific details are set fourth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

FIRST EMBODIMENT

A data processing system, according to a first embodiment of the present invention, includes, as shown in FIG. 1, a data storage unit 40, which has a virtual area stored with 2-dimentional data in a matrix, a block setting module 11, which reads 2-dimentional data from the data storage unit 40, sets a to-be-processed block shape including subject data, which is one of 2-dimentional data, and influenced data, which are influenced by the results of processing the subject data, and stores information of the to-be-processed block shape in a block information area 24, a division module 12, which reads the information of the to-be-processed block shape from the block information area 24, divides the 2-dimentional data into a plurality of execution blocks based on the information of the to-be-processed block shape, and stores information of the plurality of execution blocks in a division information area 25, and a processing module 13, which sequentially processes data included in each execution block along the row direction and then stores the resulting processed data in the data storage unit 40.

The block setting module 11 includes a detector submodule 111, a rectangular block setting submodule 112, a calculator submodule 113, and a to-be-processed block setting submodule 114. The detector submodule 111 detects the positions of influenced data, and then stores information of the detected positions of the influenced data and subject data in a positional information area 21. The rectangular block setting submodule 112 reads the positional information of influenced data and subject data from the positional information area 21, sets a rectangular block shape based on the positional information of influenced data and subject data, and stores the rectangular block shape in a shape information area 22. The calculator submodule 113 reads the positional information of influenced data and subject data from the positional information area 21, calculates the maximum angle θ max of obtuse angles between a line parallel to the row direction and a line extending from the subject data to each of the influenced data, and stores the calculated maximum angle θ max in an angle information area 23. The to-be-processed block setting submodule 114 reads the rectangular block shape from the shape information area 22 and the maximum angle θ max from the angle information area 23, sets a to-be-processed block shape based on the rectangular block shape and the maximum angle θ max, and stores information of the to-be-processed block shape in the block information area 24. The block setting module 11, the division module 12, the processing module 13, and the internal storage unit 20 are included in the matrix calculation unit 10. The positional information area 21, the shape information area 22, the angle information area 23, the block information area 24, and the division information area 25 are included in the internal storage unit 20. Also, the internal storage unit 20 includes a processed data area 26 in which 2-dimensional data in each execution block is stored.

The data processing system includes a data transmitter 30, which transmits 2-dimentional data in each execution block from the data storage unit 40 to the processed data area 26. Further, the data processing system includes a program storage unit 50 in which data processing programs and the like are stored.

The data processing system also includes an input unit 60 and an output unit 70. The input unit 60 is implemented by a keyboard, a mouse, a writing pen, a flexible disk and the like. An operator can designate input/output data and/or modify programs via the input unit 60. Moreover, setting an output data format via the input unit is possible, and executing data processing and/or inputting an instruction for stopping that execution is also possible.

The output unit 70 may be a display in which the results of data processing are displayed, a printer, or a recording unit, which stores results in a computer-readable recording medium. The 'computer-readable recording medium' means an external memory unit for a computer, a semiconductor memory, a magnetic disk, an optical disk, a magneto optical disk, or a medium such as a magnetic tape, which is capable of being recorded with electronic data. More specifically, the 'computer-readable recording medium' may be a flexible disk, Compact Disc Read Only Memory (CD-ROM), a magneto-optic (MO) disk, a cassette tape, an open-reel tape or the like.

A central processing unit (CPU) 90 controls the operations of the matrix calculation unit 10, the data transmitter 30 and related units. The matrix calculation unit 10, the data transmitter 30, the data storage unit 40, the program storage unit 50, the input unit 60, the output unit 70, and the CPU 90 are connected to a bus 80. Data and the like are transmitted through the bus 80.

Figure 2:
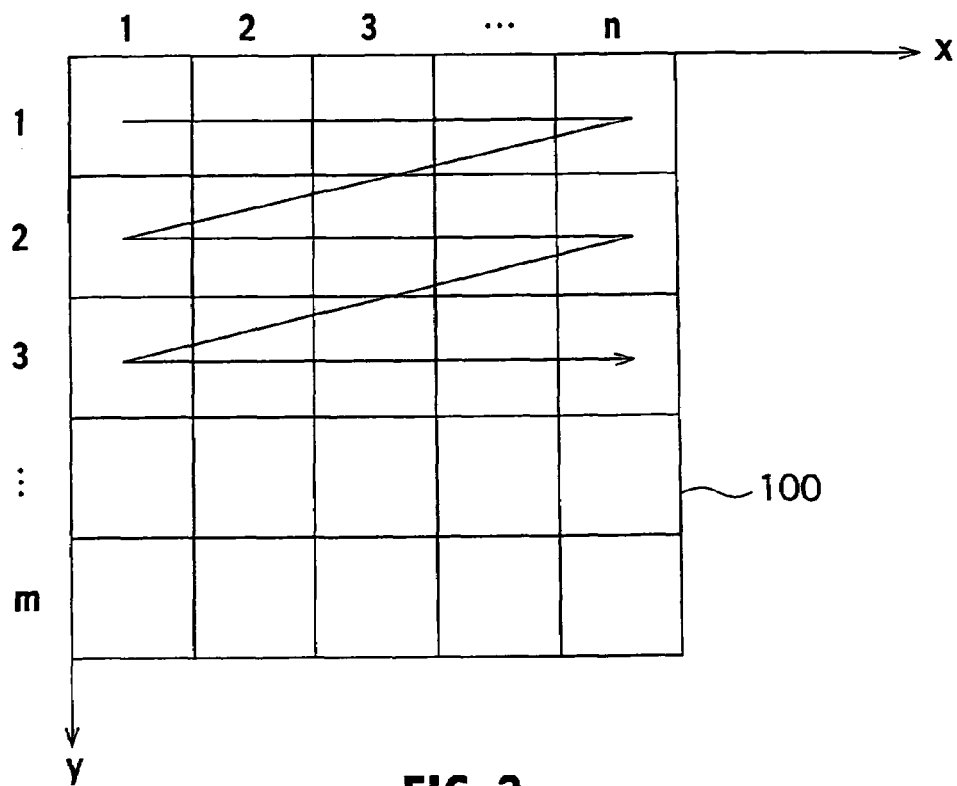
FIG. 2 is a schematic diagram for explaining a data processing method according to the first embodiment of the present invention.
Figure 3:
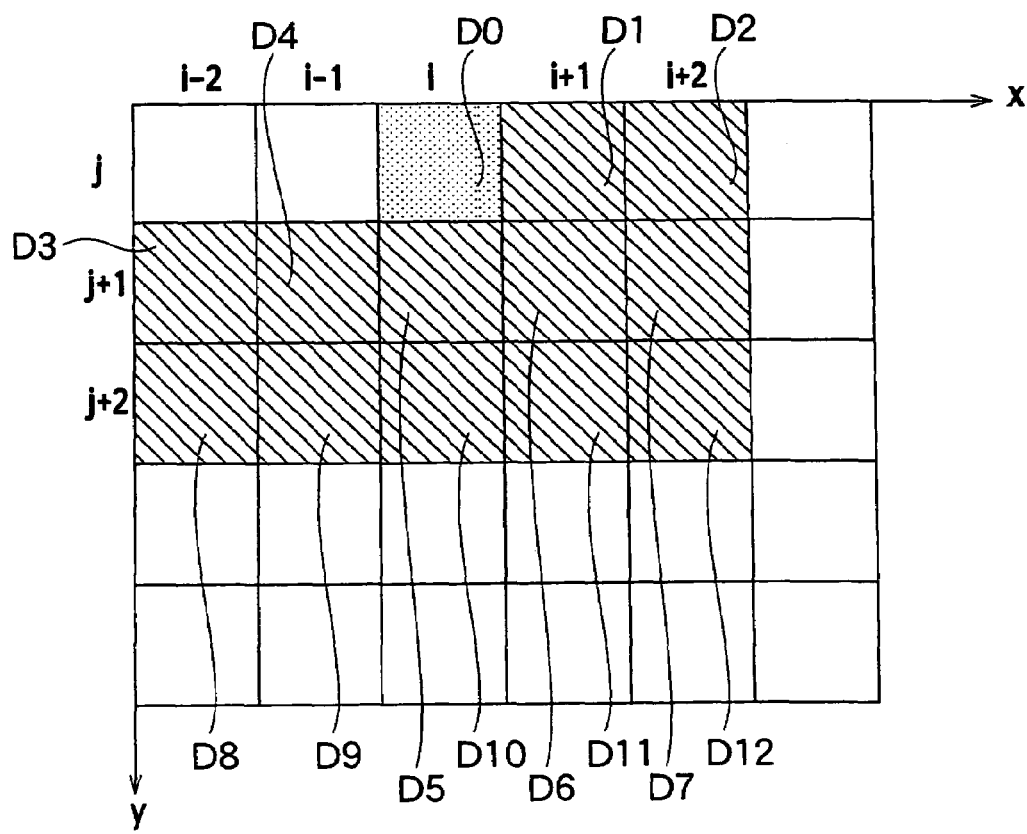
FIG. 3 is a schematic diagram for explaining influenced data, which is set by the data processing system according to the first embodiment of the present invention.

Firstly, an algorithm to be used for the data processing system shown in FIG. 1 to process data (hereafter, referred to as 'processing algorithm') is explained forthwith. According to the processing algorithm, in 2-dimentional data 100 in a matrix stored in a virtual area as shown in FIG. 2, pieces of data of y=1 along the row direction (x direction) are processed piece by piece. The 2-dimentional data 100 has n pieces of data in an x direction and m pieces of data in a y direction (along the column direction) (where n and m are integers of 2 or greater, respectively.). In the following description, the position with x=1 and y=1 is referred to as (1, 1). Accordingly, pieces of data from the position (1, 1) to position (n, 1) are sequentially processed. Once processing of data of y=1 has concluded, pieces of data in y=2 are then processed piece by piece in the x direction. In the same manner, subsequent data processing is carried out in the y direction. Lastly, pieces of data in positions (1, m) to (n, m) are processed. The processing algorithm uses an error diffusion method for binarizing, for example. According to the 'error diffusion method', errors resulting from processing subject data are assigned to the influenced data surrounding the subject data. Influences of errors assigned to the respective influenced data are considered for processing those influenced data. FIG. 3 shows an example of a processing algorithm using the error diffusion method. More specifically, FIG. 3 shows an arrangement of subject data D0 and influenced data D1 to D12. In FIG. 3, data in position (i, j) is subject data D0 (where i, j are integers of 1 or greater, respectively). The positions of respective influenced data D1 to D12 are shown with oblique lines in FIG. 3. Position (i+1, j) is for influenced data D1; position (i+2, j) is for influenced data D2; position (i−2, j+1) is for influenced data D3; position (i−1, j+1) is for influenced data D4; position (i, j+1) is for influenced data D5; position (i+1, j+1) is for influenced data D6; position (i+2, j+1) is for influenced data D7; position (i−2, j+2) is for influenced data D8; position (i−1, j+2) is for influenced data D9; position (i, j+2) is for influenced data D10; position (i+1, j+2) is for influenced data D11; and position (i+2, j+2) is for influenced data D12.

Figure 4:
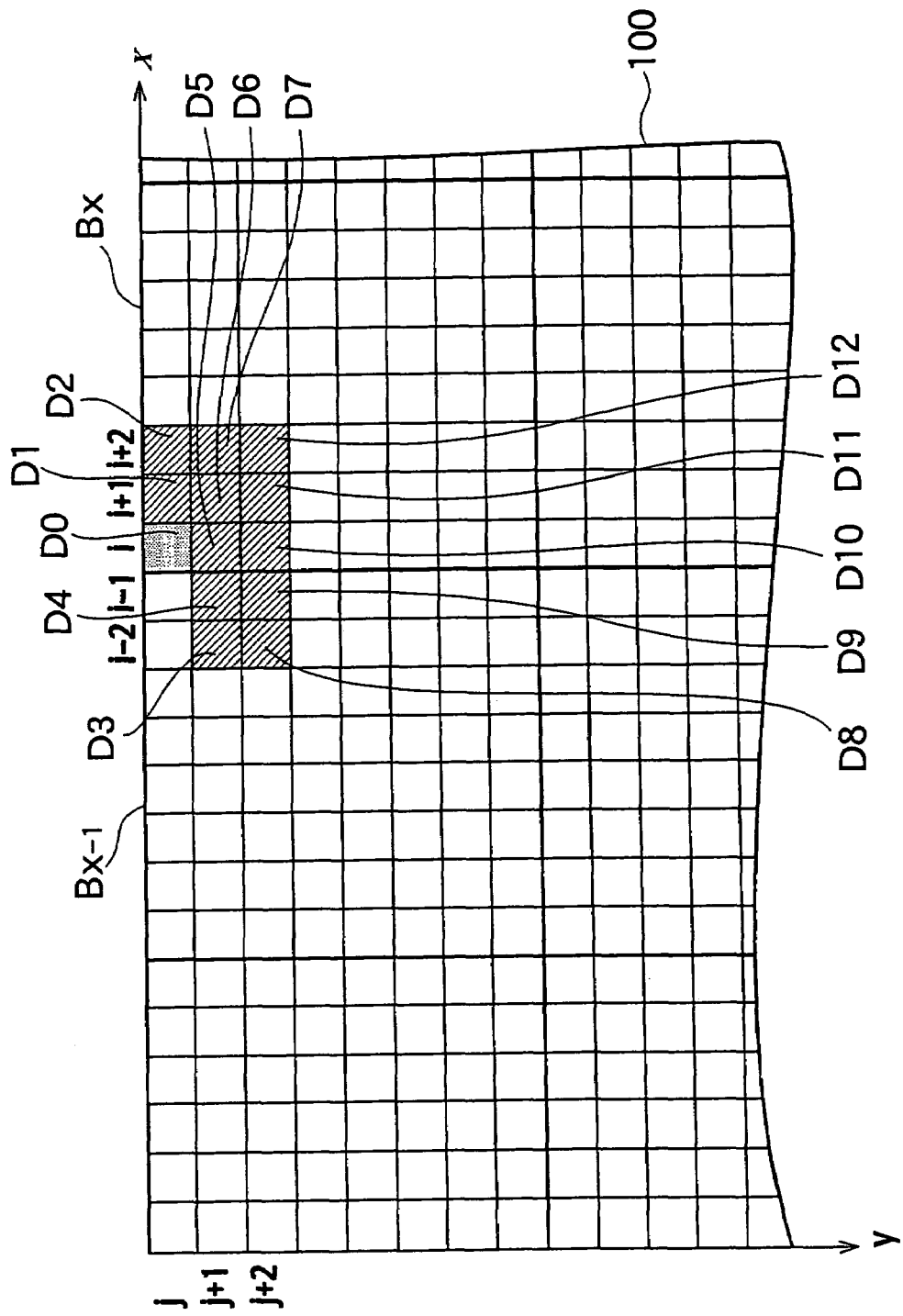
FIG. 4 is a schematic diagram explaining an example of divided 2-dimentional data.

According to the processing algorithm described above, the entire 2-dimentional data 100 is processed by first processing the subject data D0 shown in FIG. 3 and then processing the influenced data D1 to D12. However, by dividing the 2-dimentional data 100 shown in FIG. 2 into a plurality of blocks, influenced data may be dispersed to the plurality of blocks. FIG. 4 shows an example of 2-dimentional data 100 being divided into 8-row by 8-column blocks. Note that FIG. 4 merely shows a part of those 2-dimentional data 100. In FIG. 4, a block $B_{X-1}$ includes the influenced data D3, D4, D8, and D9. A block $B_X$ includes the remaining influenced data D1, D2, D5, D6, D7, D10, D11, and D12 and subject data D0.

Therefore, in the case of processing the block $B_X$ after block $B_{X-1}$ has been processed, the influenced data D3, D4, D8, and D9 are processed before the subject data D0. This makes it impossible to consider influences of errors resulting from processing the subject data D0 before processing the influenced data D3, D4, D8, and D9. In other words, it is difficult to correspond the results of processing the influenced data D3, D4, D8, and D9 after dividing into multiple blocks as shown in FIG. 4, with results of processing the same without dividing into blocks.

Figure 5:
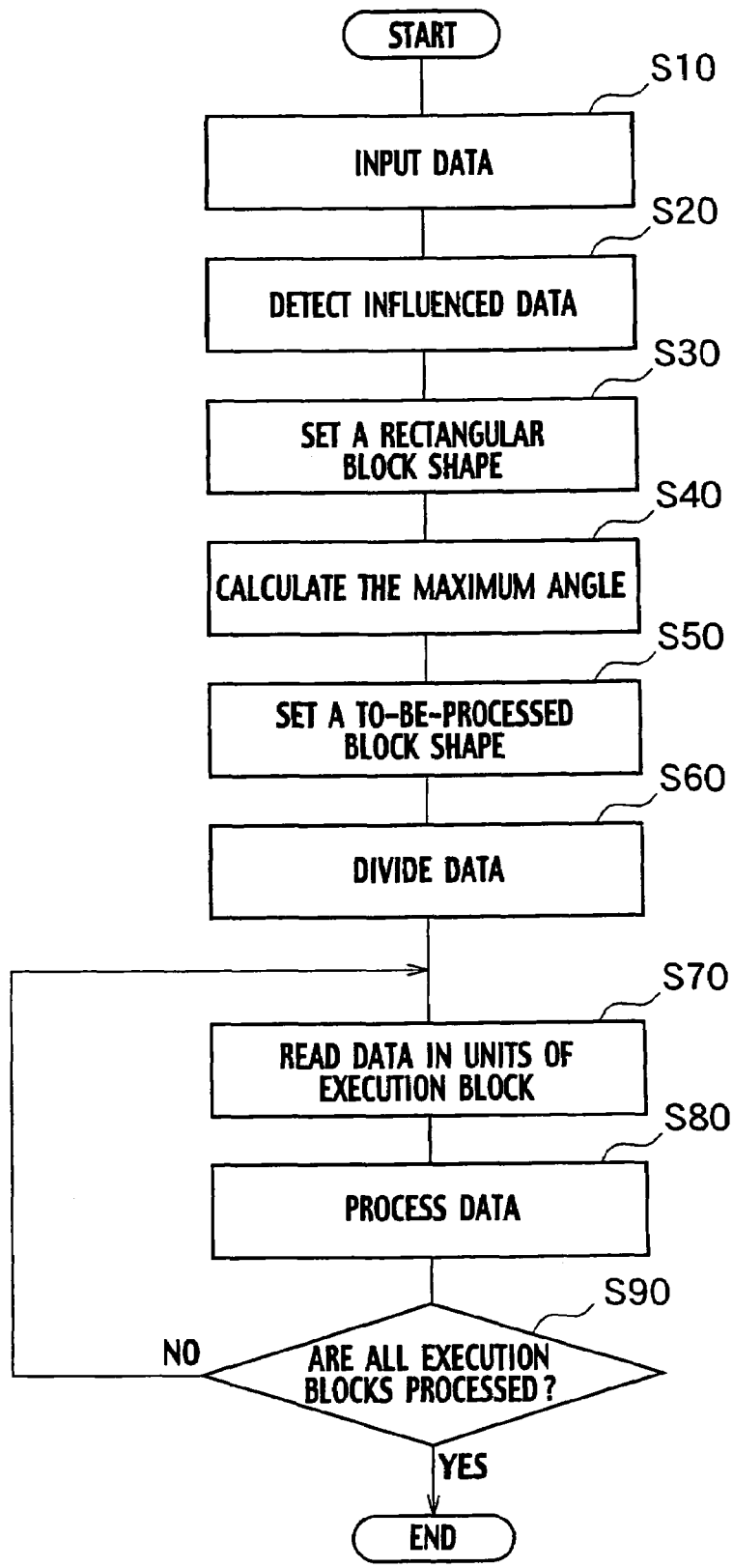
FIG. 5 is a flowchart explaining a data processing method according to the first embodiment of the present invention.

An exemplary method of processing the 2-dimentional data 100 shown in FIG. 2 by the data processing system is explained using a flowchart of FIG. 5.

In step S10 of FIG. 5, the 2-dimentional data 100 such as image data shown in FIG. 2 is stored in the data storage unit 40 via the input unit 60 shown in FIG. 1. A data processing program, which uses the algorithm described above, is stored in the program storage unit 50 via the input unit 60. The processing program may be pre-stored in the program storage unit 50.

In step S20, the detector submodule 111 reads the 2-dimensional data 100 from the data storage unit 40. The detector submodule 111 detects the positions of influenced data by processing subject data of the 2-dimentional data 100. The positions of the influenced data are determined by a processing algorithm. As shown in FIG. 3, a case of positions (i+1, j), (i+2, j), (i−2, j+1), (i−1, j+1), (i, j+1), (i+1, j+1), (i+2, j+1), (i−2, j+2), (i−1, j+2), (i, j+2), (i+1, j+2), and (i+2, j+2) of influenced data D1 to D12 corresponding to the subject data D0 in position (i, j) being found is explained forthwith. Positional information of the subject data D0 and the detected influenced data D1 to D12 are stored in the positional information area 21.

Figure 6:
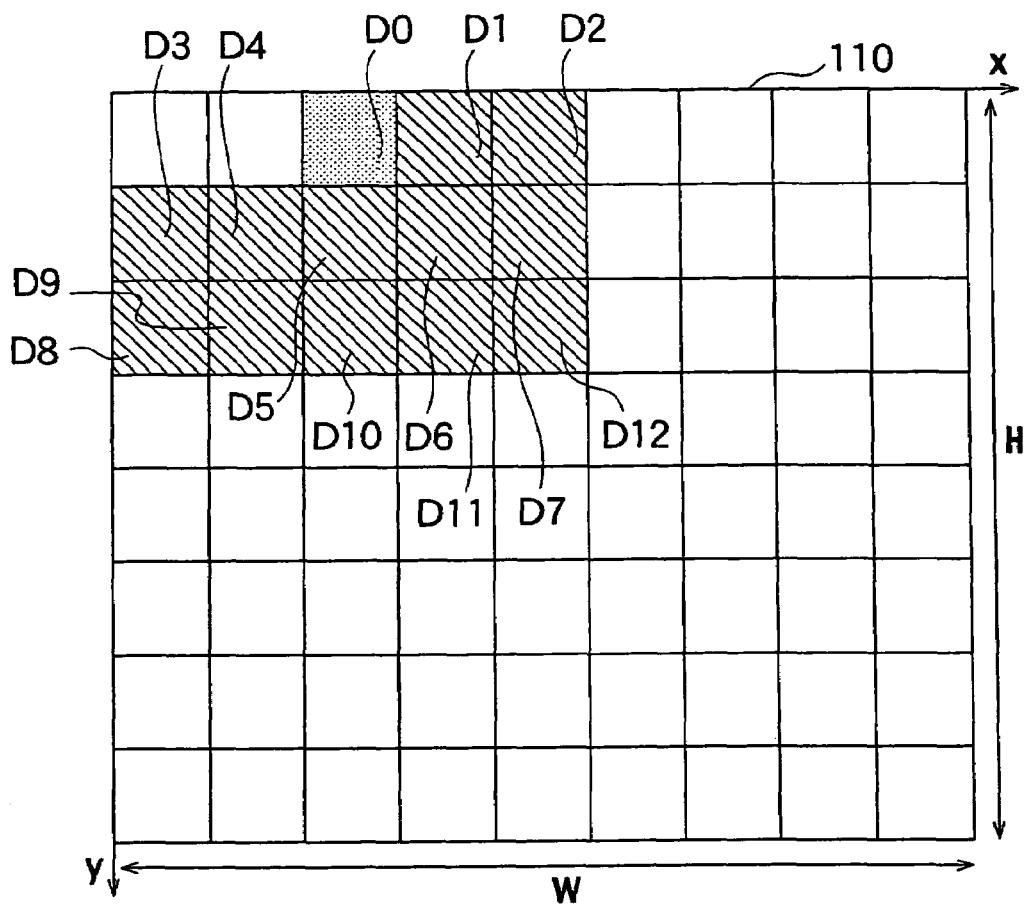
FIG. 6 is a schematic diagram for explaining an exemplary rectangular block, which is set by the data processing system according to the first embodiment of the present invention.

In step S30, the rectangular block setting submodule 112 reads positional information of the subject data D0 and influenced data D1 to D12 from the positional information area 21. A rectangular block shape including all of the subject data D0 and the influenced data D1 to D12 is set based on the positional information thereof using the rectangular block setting submodule 112. That rectangular block shape is set taking into account the number of storable data in the processed data area 26 and the width of the bus 80 using the rectangular block setting submodule 112. The rectangular block shape is set for 8-row by 8-column data, for example, as shown in FIG. 6. The rectangular block 110 shape shown in FIG. 6 has width W and height H; where width W denotes the length of a side parallel to the x direction, and height H denotes the length of a side parallel to the y direction. Information on the rectangular block 110 shape is stored in the shape information area 22.

Figure 7:
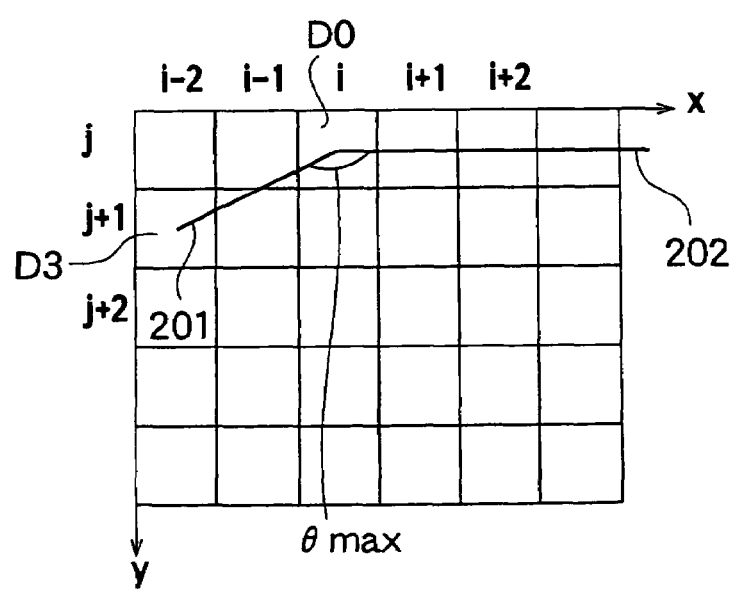
FIG. 7 is a schematic diagram for explaining an exemplary maximum angle, which is calculated by the data processing system according to the first embodiment of the present invention.

In step S40, the calculator submodule 113 reads positional information of the subject data D0 and the influenced data D1 to D12 from the positional information area 21. The calculator submodule 113 calculates the maximum angle θmax of obtuse angles between a straight line parallel to the x direction and a straight line extending from the position of the subject data D0 to each position of the influenced data D1 to D12. As shown in FIG. 7, the example shown in FIG. 3 has a maximum angle θmax between a first straight line 201 extending from the subject data D0 to the influenced data D3 and a second straight line 202 parallel to the x direction. In other words, the maximum angle θmax represents an inclination of a straight line which represents a ratio of change for two pieces of data in the −x direction to change for a single piece of data in the y direction. Accordingly, this can be represented by an equation: tan (maximum angle θmax)=dy/dx=−½; where dy denotes the difference from the subject data D0 to the influenced data D3 in the y direction, and dx denotes the difference from the subject data D0 to the influenced data D3 in the x direction. The maximum angle θmax is stored in the angle information area 23.

Figure 8:
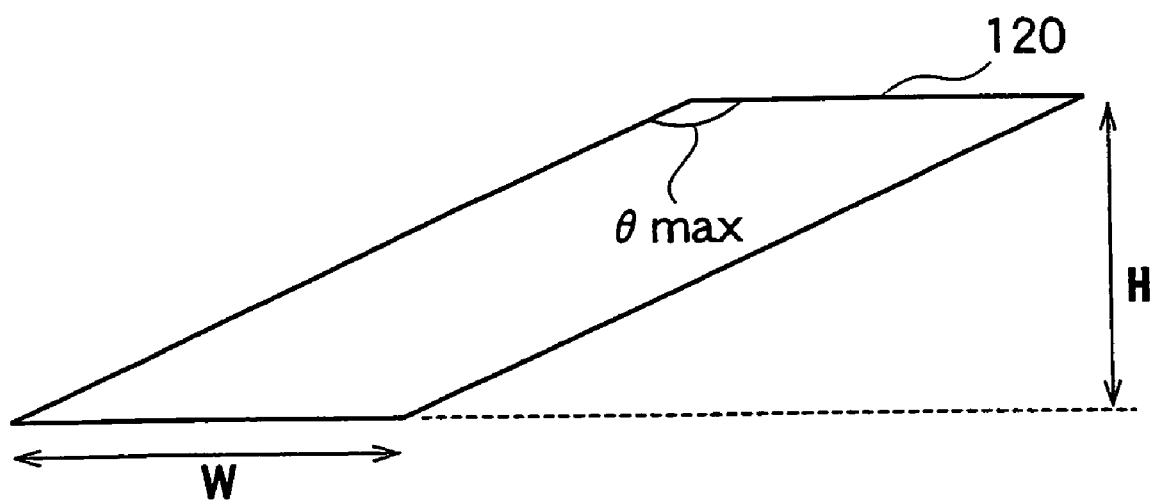
FIG. 8 is a schematic diagram for explaining an exemplary to-be-processed block, which is set by the data processing system according to the first embodiment of the present invention.

In step S50, the to-be-processed block setting submodule 114 reads the information on the rectangular block 110 shape from the shape information area 22, and the maximum angle θ max from the angle information area 23. The to-be-processed block setting submodule 114 decides the shape of a to-be-processed block 120 as shown in FIG. 8, based on the rectangular block 110 shape and the maximum angle θ max. More specifically, the shape of the to-be-processed block 120 is a parallelogram with the length of the base being equal to width W of the rectangular block 110, the height being equal to height H of the rectangular block 110, and an interior angle being equal to the maximum angle θ max. Information on the rectangular block 120 shape is stored in the shape information area 24.

Figure 9:
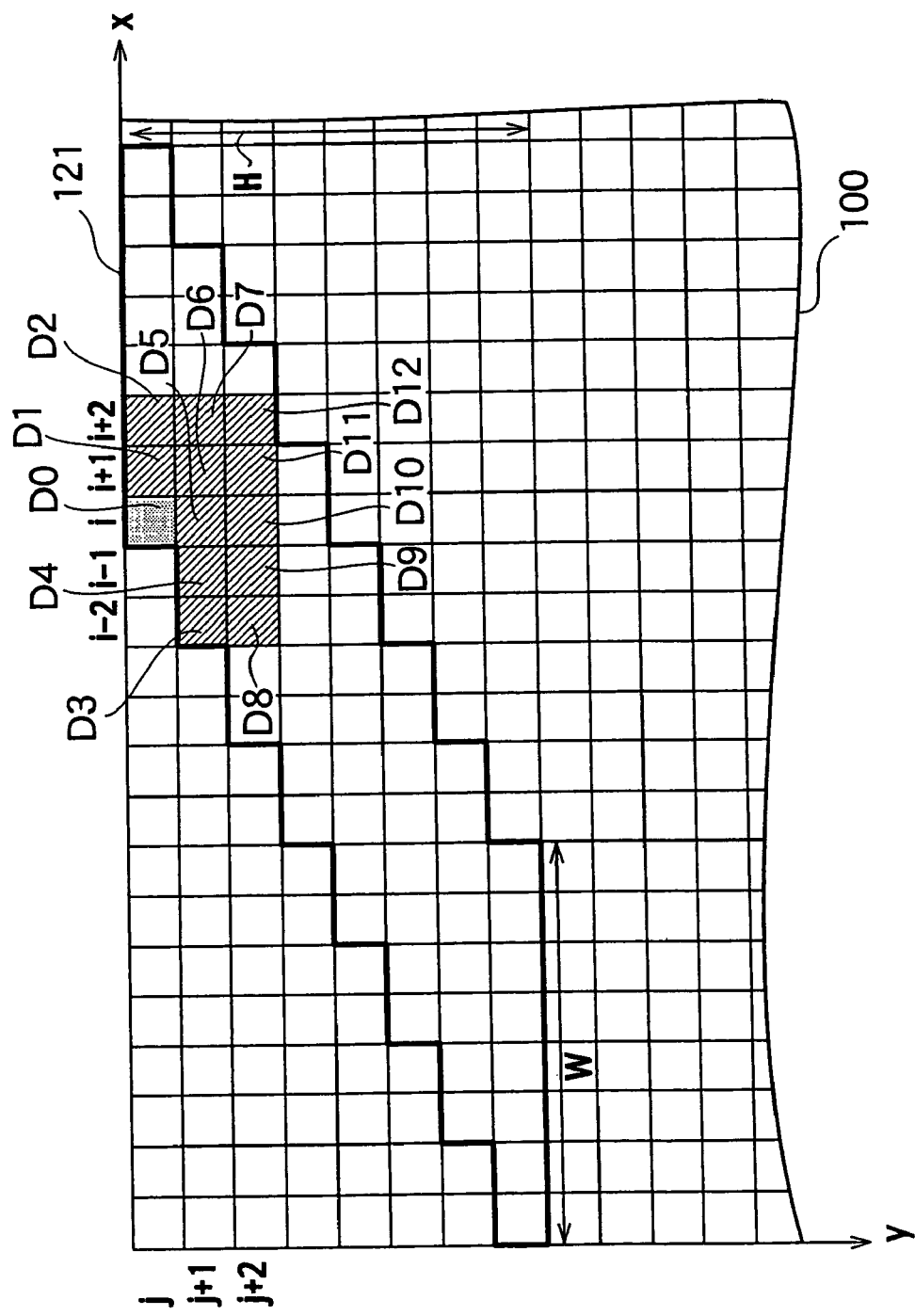
FIG. 9 is a schematic diagram for explaining an exemplary divided 2-dimentional data, which is prepared by the data processing system according to the first embodiment of the present invention.

In step S60, the division module 12 reads the information on the to-be-processed block 120 shape from the block information area 24. The division module 12 divides the 2-dimentional data 100 into a plurality of execution blocks 121 as shown in FIG. 9, based on the information of the to-be-processed block 120 shape. FIG. 9 shows only one execution block 121; however, in actuality, the entire 2-dimensional data 100 is divided into a plurality of execution blocks 121. The execution block 121 includes 8 pieces of data in the x direction and 8 pieces of data in the y direction. The position of data in the outer region of the execution block 121 changes in a ratio of change for two pieces of data in the −x direction to change for a single piece of data in the y direction. In other words, the shape formed by straight lines connecting the outer data positions in the execution block 121 is the same parallelogram as that of the to-be-processed block 120 shown in FIG. 8. Since a piece of data of the 2-dimentional data 100 is represented by a square in FIG. 9, the shape of the outer edge of the execution block 121 running in the y direction is the shape of a staircase. As shown in FIG. 9, the subject data D0 and the influenced data D1 to D12 are included in the same execution block 121. The number of data in the execution block 121 is the same as the number of data in the rectangular block 110. Therefore, the number of data in the execution block 121 is equal to the storable number of data in the processed data area 26. Information of execution blocks 121, which are provided by dividing the 2-dimentional data 100, is stored in the division information area 25. The information on each execution block 121 is positional information and the like of the data included in each execution block 121.

In step S70, the data transmitter 30 reads the information on execution blocks 121 from the block information area 24. The data transmitter 30 transmits data included in the 2-dimentional data 100 to the processed data area 26 in units of each execution block 121 based on the information of the execution blocks 121. The execution blocks 121 are transmitted in order of the arrangement in the x direction, for example. After transmission of a single row in the execution block 121, an adjacent row in the execution block 121 in the y direction is transmitted.

In step S80, the processing module 13 reads data in the execution block 121 from the processed data area 26. The processing module 13 processes data in the execution block 121 according to a processing program stored in the program storage unit 50. This means that data of y=j stored in the execution block 121 is processed piece by piece in the x direction. Once processing of data of y=j has concluded, data of y=j+1 is then processed piece by piece in the x direction. Therefore, after the subject data D0 shown in FIG. 9 is processed, the influenced data D1 to D12 are then processed. The processing results are stored in the data storage unit 40.

In step S90, the data transmitter 30 determines whether or not all execution blocks 121 have been processed. If there is an execution block 121 not processed yet, processing returns to step S70. Otherwise, if all execution blocks 121 have been processed, processing is concluded. The processing results stored in the data storage unit 40 can be output to the outside via the output unit 70.

As described above, the data processing system shown in FIG. 1 processes the influenced data D1 to D12 in each execution block 121, which is provided by dividing the 2-dimentional data 100, after the subject data D0 has been processed. As a result, the results of processing data in each divided block can be the same as results of processing without dividing into blocks. Therefore, it is unnecessary to correspond the capacity of the processed data area 26 with the actual data volume to be processed. This allows for a reduction in the processed data area 26 to a capacity for the number of data included in each block. Moreover, it is unnecessary to calculate for correction so as to predict influences on influenced data, which is processed earlier than subject data. Therefore, a decrease in the processing speed can be controlled.

SECOND EMBODIMENT

Figure 10:
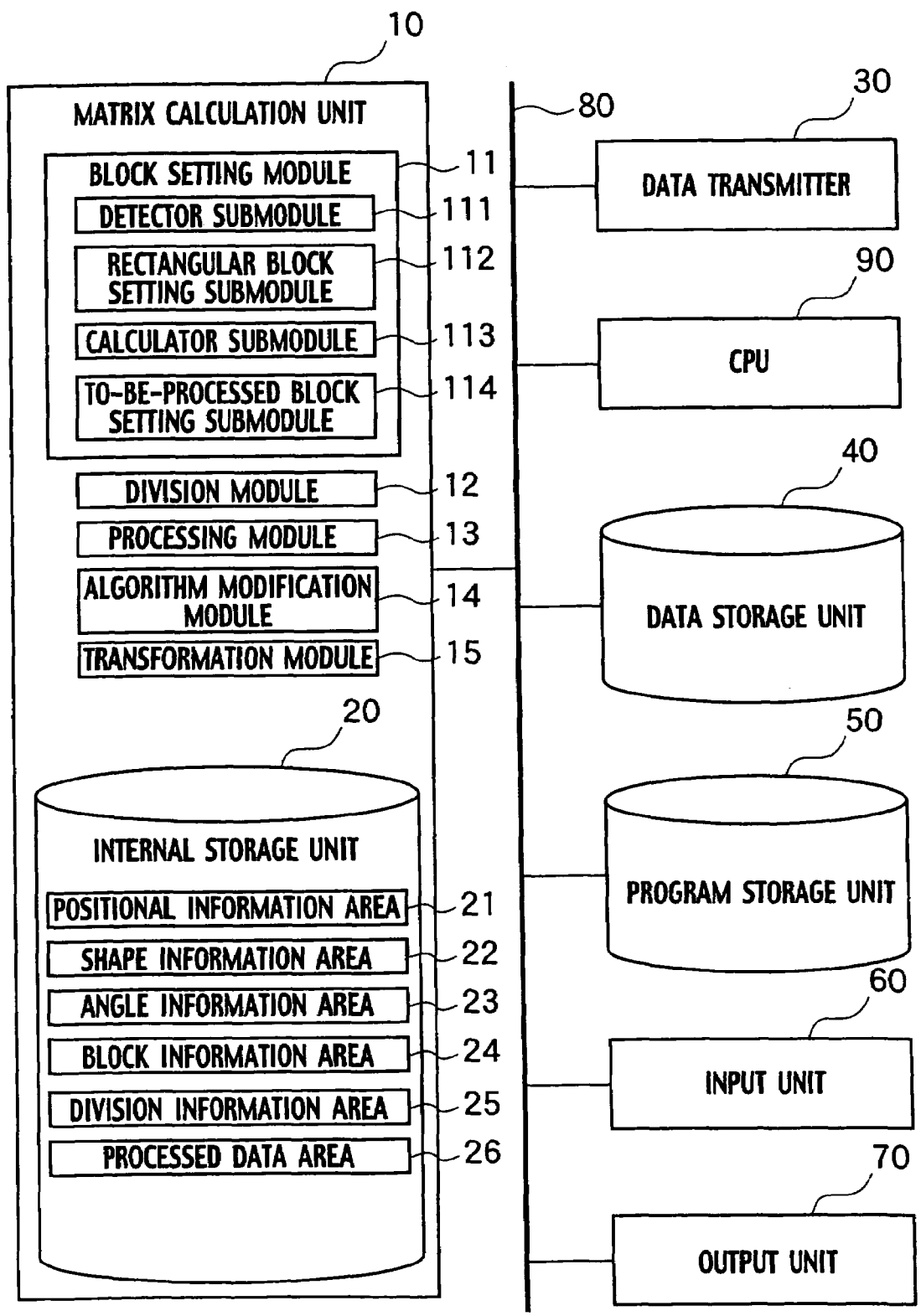
FIG. 10 is a schematic diagram showing a structure of a data processing system according to a second embodiment of the present invention.

A data processing system according to a second embodiment of the present invention differs from that shown in FIG. 1 in that an algorithm modification module 14 and a transformation module 15 are additionally provided, as shown in FIG. 10. The rest of the structure is the same as that of the first embodiment shown in FIG. 1.

Figure 12:
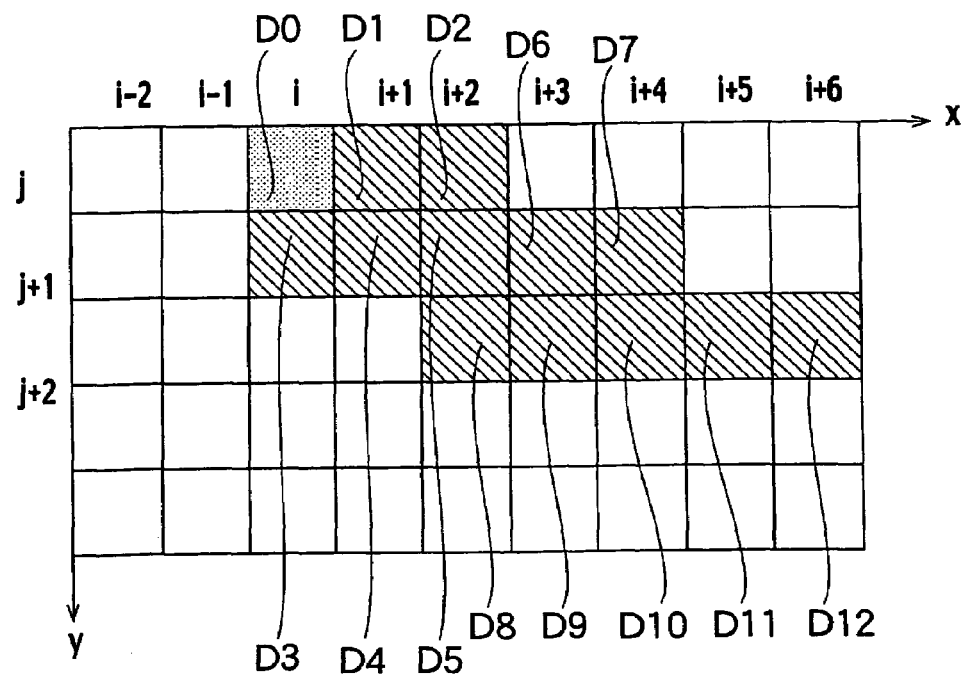
FIG. 12 is a schematic diagram for explaining influenced data, which is set by the data processing system according to the second embodiment of the present invention.

The algorithm modification module 14 reads the information of the to-be-processed block 120 shape from the block information area 24. The algorithm modification module 14 modifies a data processing algorithm based on the information of the to-be-processed block 120 shape. More specifically, the algorithm modification module 14 modifies the positions of the influenced data in the x direction so that the maximum angle $\theta$max is 90°. Positions of influenced data decided by a processing algorithm before being modified are explained for the exemplary case shown in FIG. 3. As described with step S40 of FIG. 5, according to the processing algorithm before being modified, the tan (maximum angle $\theta$max)=dy/dx=−½. According to a modified processing algorithm, a row of influenced data, which is located a distance dy off the row of y=j in the y direction, is shifted a distance dy×(−dx/dy) in the x direction. Consequently, the positions of the influenced data D1 to D12 shown in FIG. 3 are modified as shown in FIG. 12. As shown in FIG. 12, in the case of the position of the subject data D0 being (i, j), the position of the influenced data D3 is (i, j+1); the position of the influenced data D4 is (i+1, j+1); the position of the influenced data D5 is (i+2, j+1); the position of the influenced data D6 is (i+3, j+1); the position of the influenced data D7 is (i+4, j+1); the position of the influenced data D8 is (i+2, j+2); the position of the influenced data D9 is (i+3, j+2); the position of the influenced data D10 is (i+4, j+2); the position of the influenced data D11 is (i+5, j+2); and the position of the influenced data D12 is (i+6, j+2). The position (i+1, j) of the influenced data D1 and position (i+2, j) of the influenced data D2 are not changed. As a result, the maximum angle $\theta$max becomes 90°.

The transformation module 15 reads the information of the to-be-processed processed block 120 shape from the block information area 24. The transformation module 15 changes the positions of the respective pieces of data in the execution block 121, based on the information of the to-be-processed block 120 shape, thereby transforming the execution block 121 shape into a rectangle. The transformation module 15 transforms the execution block 121 shape into a rectangle by changing the positions of the respective pieces of data in the execution block 121, based on the information of the to-be-processed block 120 shape.

Figure 13:
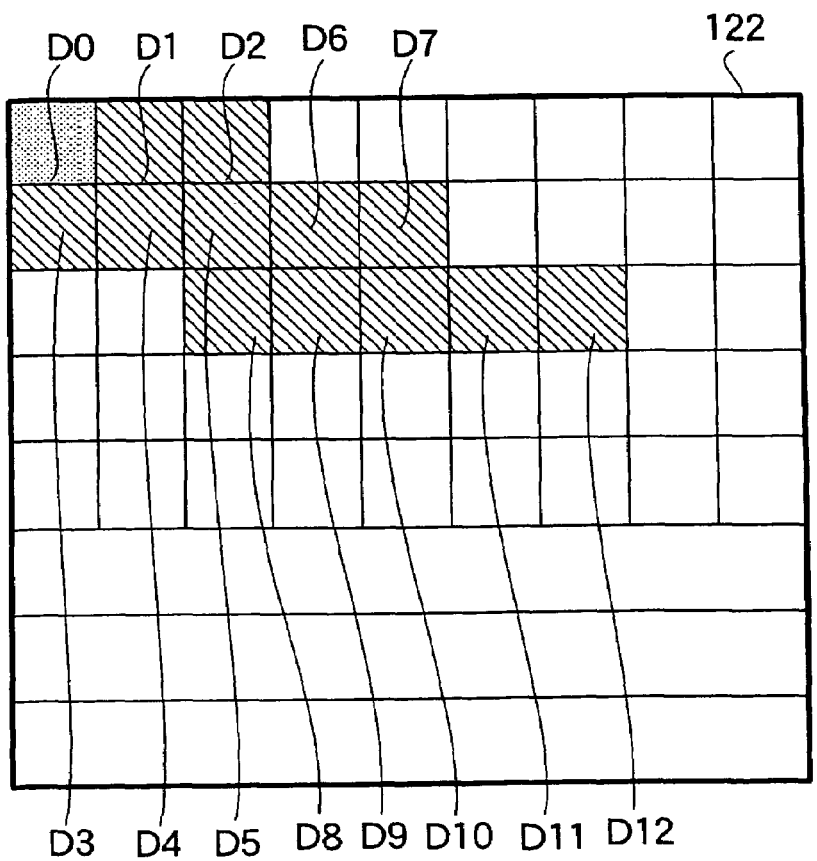
FIG. 13 is a schematic diagram for explaining an exemplary rectangular execution processing block, which is set by the data processing system according to the second embodiment of the present invention.

A case of the transformation module 15 transforming the execution block 121 shown in FIG. 9 into a rectangular execution block 122 shown in FIG. 13 is described forthwith. The maximum angle $\theta$ max of the to-be-processed block 120 is dy/dx=−½. The position of data in the outer region of the execution block 121 shown in FIG. 9 changes with a ratio of change for two pieces of data in the −x direction to change for a single piece of data in the y direction. The transformation module 15 changes the position of data in the x direction included in the execution block 121 in a manner as described below. Firstly, a row in the execution block 121 to be processed first is regarded as a base row. In FIG. 9, the base row is a row of y=j. Secondly, the positions of a row of pieces of data, which is located a distance dy off the base row in the y direction, are shifted a distance dy×(−dx/dy) in the x direction. As a result, the execution block 121 shown in FIG. 9 is transformed to the rectangular execution block 122 shown in FIG. 13. As shown in FIG. 13, the positions of the subject data D0 and the influenced data D1 to D12 correspond to respective positions of subject data D0 and influenced data determined by a modified processing algorithm shown in FIG. 12.

Figure 11:
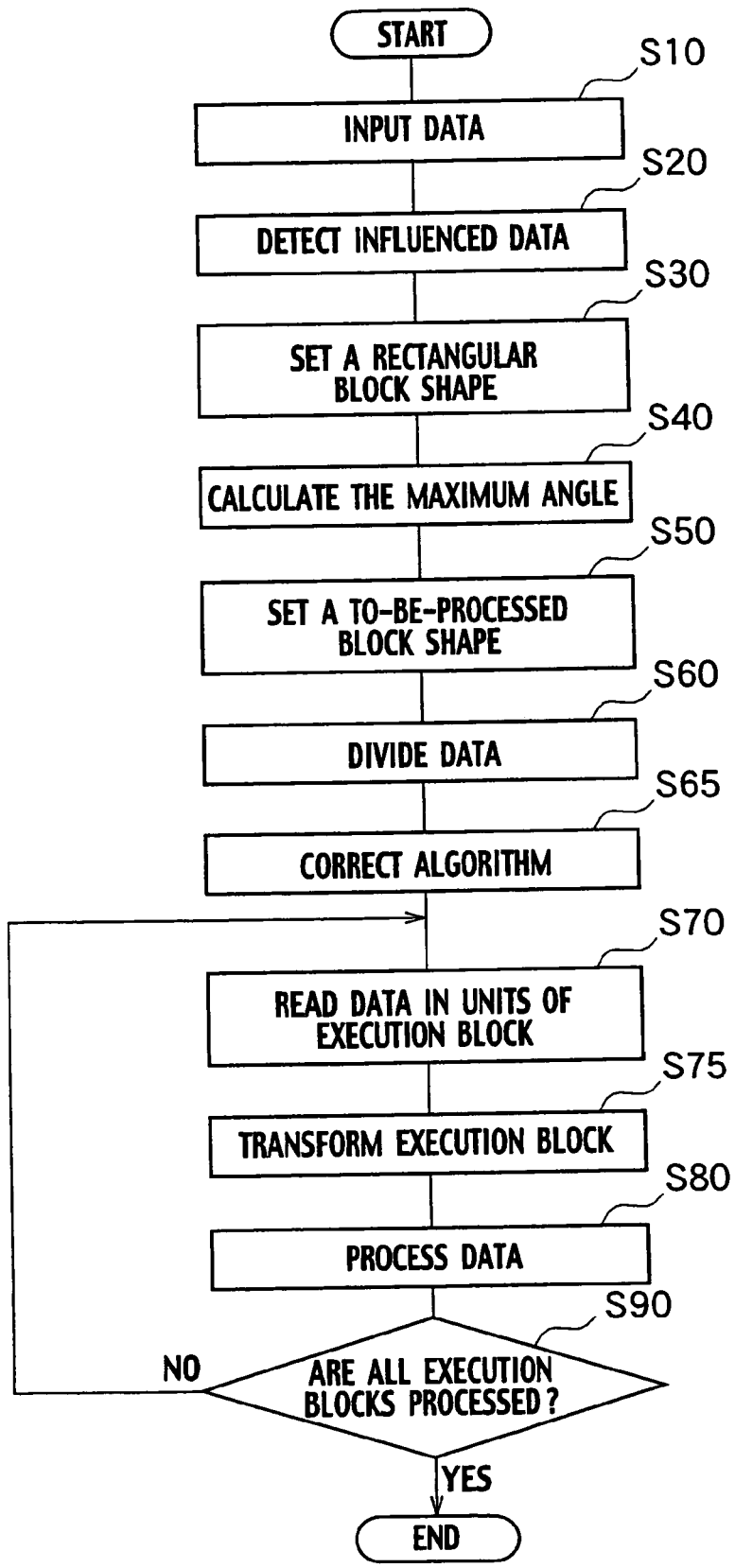
FIG. 11 is a flowchart explaining a data processing method according to the second embodiment of the present invention.

An exemplary method of processing the 2-dimentional data 100 shown in FIG. 2 by the data processing system shown in FIG. 10 is explained using a flowchart of FIG. 11.

In steps S10 to S60, the 2-dimentional data 100 is divided as shown in FIG. 9 in the same manner as that according to the first embodiment. Information on the rectangular block 120 shape is stored in the block information area 24. Information on execution blocks 121, which are provided by dividing the 2-dimentional data 100, is stored in the division information area 25.

In step S65, the algorithm modification module 14 reads the information of the to-be-processed block 120 shape from the block information area 24. The processing algorithm is modified using the method described above such that the maximum angle θ max can be 90°. The modified processing program corresponding to the modified processing algorithm is stored in the program storage unit 50.

In step S70, the data transmitter 30 reads the information of the execution blocks 121 from the block information area 24. The data transmitter 30 transmits data included in the 2-dimentional data 100 to the processed data area 26 in units of execution block 121 based on the information of the execution blocks 121.

In step S75, the transformation module 15 reads the information on the execution blocks 121 from the block information area 24. The positions of data included in, for example, the execution block 121 shown in FIG. 9 are changed using the method described above. As a result, the execution block 121 shape is modified into the rectangular execution block 122 shown in FIG. 13. Data in the rectangular execution block 122 is stored in the processed data area 26.

In step S80, the processing module 13 reads data in the rectangular execution block 122 from the processed data area 26. The processing module 13 processes data in the rectangular execution block 122 in conformity with the modified processing program stored in the program storage unit 50.

In step S90, the data transmitter 30 determines whether or not all rectangular execution blocks 122 have been processed. If there is a rectangular execution block 122 not processed yet, processing returns to step S70. Otherwise, if all rectangular execution blocks 122 have been processed, processing is concluded.

The data processing system according to the second embodiment of the present invention processes data in the rectangular execution block 122. Processing in units of rectangular blocks allows easy description of positional information and easy data transmission. The rest of the structures are substantially the same as those of the first embodiment, and repetitive descriptions thereof are omitted.

Various modifications will become possible for those skilled in the art after receiving the teachings of the present disclosure without departing from the scope thereof.

What is claimed is:

1. A data processing system comprising:
    a block setting module configured to set a to-be-processed block shape including subject data, which is one of 2-dimentional data in a matrix stored in a virtual storage area, and influenced data influenced by results of processing the subject data, the block setting module comprising:
        a rectangular block setting submodule configured to set a rectangular block shape based on positional information of the subject data and the influenced data;
        a calculator submodule configured to calculate the maximum angle of a plurality of obtuse angles between a straight line along the row direction and a straight line extending from the subject data to each of the influenced data; and
        a to-be-processed block setting submodule configured to set the to-be-processed block shape, based on the rectangular block shape and the maximum angle;
    a division module configured to divide the 2-dimentional data into a plurality of execution blocks based on information of the to-be processed block shape; and
    a processing module configured to sequentially process data in each execution block along a row direction in units of execution blocks.

2. The system of claim 1, wherein the block setting module comprises a detector submodule configured to detect the positions of the influenced data.

3. The system of claim 2, wherein a data processing algorithm detects the positions of the influenced data.

4. The system of claim 1, further comprising:
    an algorithm modification module configured to modify a data processing algorithm based on information on the to-be-processed block shape; and
    a transformation module configured to transform the execution block shape into a rectangle by changing the positions of data in the execution block based on information on the to-be-processed block shape.

5. The system of claim 1, further comprising a data storage unit configured to store the 2-dimentional data.

6. The system of claim 1, further comprising a processed data area configured to store data included in the execution block.

7. A computer implemented method for processing two-dimensional data comprising:
    setting a rectangular block shape based on positional information of subject data, which is one of 2-dimentional data in a matrix stored in a virtual storage area, and influenced data influenced by results of processing the subject data by a rectangular block setting submodule of a data processing system:
    calculating the maximum angle of a plurality of obtuse angles between a straight line along a row direction and a straight line extending from the subject data to each of the influenced data by a calculator submodule of the data processing system;
    setting a to-be-processed block shape including the subject data, and the influenced data by a to-be-processed block setting submodule of the data processing system, based on the rectangular block shape and the maximum angle;
    dividing the 2-dimentional data into a plurality of execution blocks based on information on the to-be-processed block shape by a division module of the data processing system; and
    sequentially processing data included in each execution block along the row direction in units of execution blocks by a processing module of the data processing system.

8. The method of claim 7, further comprising detecting the positions of the influenced data.

9. The method of claim 8, wherein a data processing algorithm detects the positions of the influenced data.

10. The method of claim 7, further comprising:
    modifying a data processing algorithm based on information of the to-be-processed block shape by an algorithm modification module of the data processing system; and
    transforming the execution block shape into a rectangle by changing the positions of data in the execution block based on the to-be-processed block shape by a transformation module of the data processing system.

11. A computer implemented method for processing image data comprising:
    setting a rectangular block shape based on positional information of subject data, which is one of image data in a matrix stored in a virtual storage area, and influenced data influenced by results of processing the subject data by a rectangular block setting submodule of a data processing system;
    calculating the maximum angle of a plurality of obtuse angles between a straight line along a row direction and a straight line extending from the subject data to each of the influenced data by a calculator submodule of the data processing system;

setting a to-be-processed block shape including the subject data and the influenced data by a to-be-processed block setting submodule of the data processing system, based on the rectangular block shape and the maximum angle;

dividing the image data into a plurality of execution blocks based on information of the to-be processed block shape by a division module of the data processing system; and sequentially processing data included in each execution block along the row direction in units of execution blocks by a processing module of the data processing system.

12. The method of claim 11, further comprising detecting the positions of the influenced data.

13. The method of claim 12, wherein a data processing algorithm detects the positions of influenced data are.

14. The method of claim 11, further comprising:

modifying the data processing algorithm based on information on the to-be-processed block shape by an algorithm modification module of the data processing system; and transforming the execution block shape into a rectangle by changing the positions of data in the execution block based on the to-be-processed block shape by a transformation module of the data processing system.

* * * * *